(12) United States Patent
Xu et al.

(10) Patent No.: US 9,753,901 B1
(45) Date of Patent: Sep. 5, 2017

(54) IDENTIFYING IMPORTANT DOCUMENT CONTENT USING GEOMETRIES OF PAGE ELEMENTS

(71) Applicant: Google Inc., Mountain View, CA (US)

(72) Inventors: Yifan Xu, Beijing (CN); Xiaofeng Mi, Summit, NJ (US)

(73) Assignee: Google Inc., Mountain View, CA (US)

( * ) Notice: Subject to any disclaimer, the term of this patent is extended or adjusted under 35 U.S.C. 154(b) by 1052 days.

(21) Appl. No.: 13/890,851

(22) Filed: May 9, 2013

Related U.S. Application Data

(60) Provisional application No. 61/728,097, filed on Nov. 19, 2012.

(51) Int. Cl.
*G06F 17/00* (2006.01)
*G06F 17/22* (2006.01)
*G06F 17/30* (2006.01)

(52) U.S. Cl.
CPC .... *G06F 17/2247* (2013.01); *G06F 17/30477* (2013.01); *G06F 17/30861* (2013.01)

(58) Field of Classification Search
CPC ......... G06F 17/30539; G06F 17/30247; G06F 17/30283; G06F 17/30395; G06F 17/30477; G06F 17/30861
See application file for complete search history.

(56) References Cited

U.S. PATENT DOCUMENTS

| | | | |
|---|---|---|---|
| 8,255,793 B2 | 8/2012 | Chakrabarti et al. | |
| 9,007,405 B1* | 4/2015 | Eldar | G09G 5/02 715/243 |
| 2008/0307301 A1* | 12/2008 | Decker | G06F 17/30905 715/241 |
| 2010/0220923 A1 | 9/2010 | Davan et al. | |
| 2012/0137238 A1* | 5/2012 | Abeln | G06F 3/04847 715/771 |
| 2013/0124953 A1* | 5/2013 | Fan | G06F 17/212 715/202 |
| 2013/0275864 A1* | 10/2013 | William | G06F 17/211 715/244 |
| 2015/0161187 A1* | 6/2015 | Dutta | G06F 17/30327 707/748 |

OTHER PUBLICATIONS

Szymanski et al. "A method for Indexing Web Pages Using Web Bots," Nov. 2001, Proc. Int. Conference on Info-Tech & Info-Net ICII'2001, Beijing, China, pp. 1-6.*
Chen et al.,"Detecting Web Page Structure for Adaptive Viewing on Small Form Factor Devices", Microsoft Research Asia, Beijing, China, May 20-24, 2003.
Goel et al.,"An Efficient Algorithm for Web Page Change Detection", International Journal of Computer Applications, vol. 48—No. 10, Jun. 2012.

\* cited by examiner

*Primary Examiner* — Ariel Mercado
(74) *Attorney, Agent, or Firm* — Fish & Richardson P.C.

(57) ABSTRACT

Systems and techniques are provided for detecting columns of an electronic page based on a render of the electronic page and identification of one or more columns based on the render. A column of interest may be identified based on detecting the one or more columns based on a physical position of the column, a column size, and/or the content within the column. The column of interest may be used to index or categorize the electronic page as the most relevant information corresponding to the page may be contained in the column of interest.

24 Claims, 7 Drawing Sheets

IDENTIFYING IMPORTANT DOCUMENT CONTENT USING GEOMETRIES OF PAGE ELEMENTS

This application claims the benefit of U.S. Provisional Application No. 61/728,097, filed Nov. 19, 2012, the disclosure of which is incorporated by reference in its entirety.

BACKGROUND

Webpages may be identified and indexed based on content contained within the webpage. However, a given webpage may contain both user relevant content as well as user irrelevant content including content that is not rendered to a user accessing the webpage (e.g., backend content). Identifying and/or indexing a webpage based on the irrelevant or backend content may result in a poor indexing and, subsequently, ineffective utilization of the identification or indexing. For example, a webpage containing the text "40 inch television" within an advertisement may be indexed as containing information corresponding to 40 inch televisions even when the actual content of the webpage does not correspond to televisions. Additionally, header and footer information of a webpage may be indistinguishable from the content of a webpage and may contribute to identifying and/or indexing a webpage inefficiently.

BRIEF SUMMARY

According to implementations of the disclosed subject matter, an electronic page may be rendered and, based on the rendering, a rendered page containing a hierarchical structure of page elements may be provided. A render node in the rendered page may be received, the render node corresponding to a document object model tree node and containing boundary information for the document object model tree node. The render node may be compared to another render node and, based on a factor such as a jump-back, one or more page columns may be detected. A column of interest may be identified based on detecting the one or more page columns and some or all of the content within the column may be assigned a weight or weights higher than content outside the column of interest. A search ranking, such as an ordered list of search results in response to a query, may be determined based on the weight of the content.

Systems and techniques according to the present disclosure allow for detection of a column of interest and, based on the detection, carry out a subsequent process in view of the column of interest. Additional features, advantages, and implementations of the disclosed subject matter may be set forth or apparent from consideration of the following detailed description, drawings, and claims. Moreover, it is to be understood that both the foregoing summary and the following detailed description include examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

An electronic page, such as a web page, may be organized with a variety of information placed on different parts of the page. As an example, a webpage may contain a header near the top portion of the page, a menu on the left most portion of the page, page-specific content in the center of the page, an advertisement on the rightmost portion of the webpage, and contact information on a footer near the bottom of the webpage. A column from the multiple columns within the electronic page may be identified as a column of interest such that the column of interest may contain the most relevant information on the electronic page. Continuing the previous example, the page-specific content in the center of the webpage may correspond to the most relevant information within the webpage. A column of interest may be identified based on any applicable criteria such as a center column, the size of a column, the content within a column, or the like. A center column may be the center of an electronic page measured vertically, horizontally, or diagonally and may be most likely to contain the information that an entity accessing the electronic page intends to obtain. Accordingly, determining the center column of an electronic page may facilitate identification of the area of the electronic page most likely to contain the most relevant information within the page and may be used for purposes of indexing the page for search, as disclosed herein. Additionally, although the substance of the disclosed subject matter refers to columns within an electronic page, the disclosed subject matter may be adopted mutatis mutandis to perform the same operations on rows within an electronic page, i.e., left-to right. Thus, as used herein, vertical columns refer similarly to horizontal rows.

Figure 1:
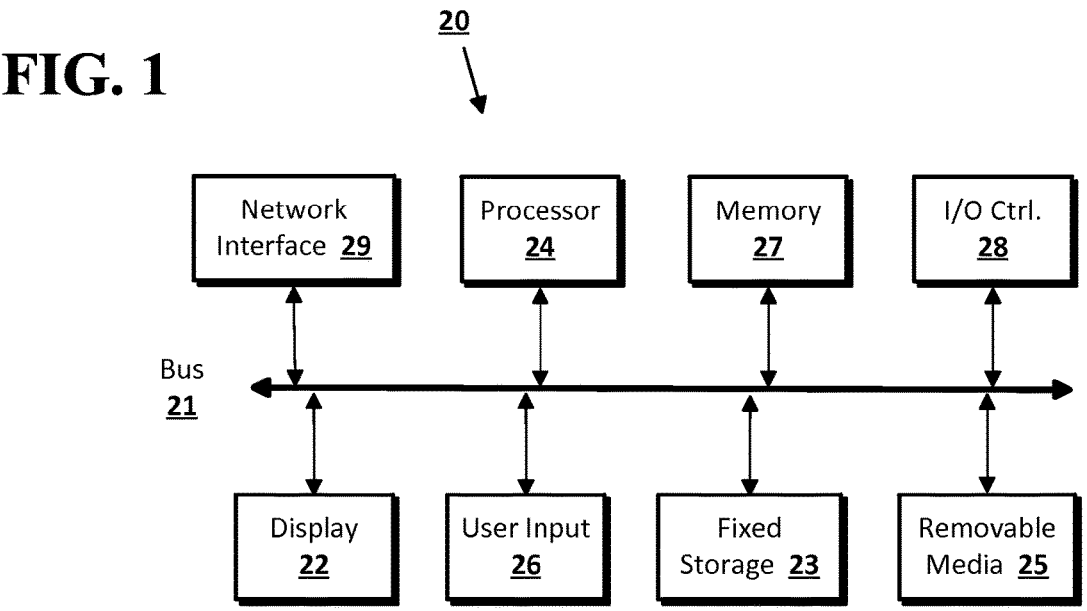
FIG. 1 shows a computer according to an implementation of the disclosed subject matter.

Implementations of the presently disclosed subject matter may be implemented in and used with a variety of component and network architectures. FIG. 1 is an example computer 20 suitable for implementing implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display or touch screen via a display adapter, a user input interface 26, which may include one or more controllers and associated user input or devices such as a keyboard, mouse, WiFi/cellular radios, touchscreen, microphone/speakers and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
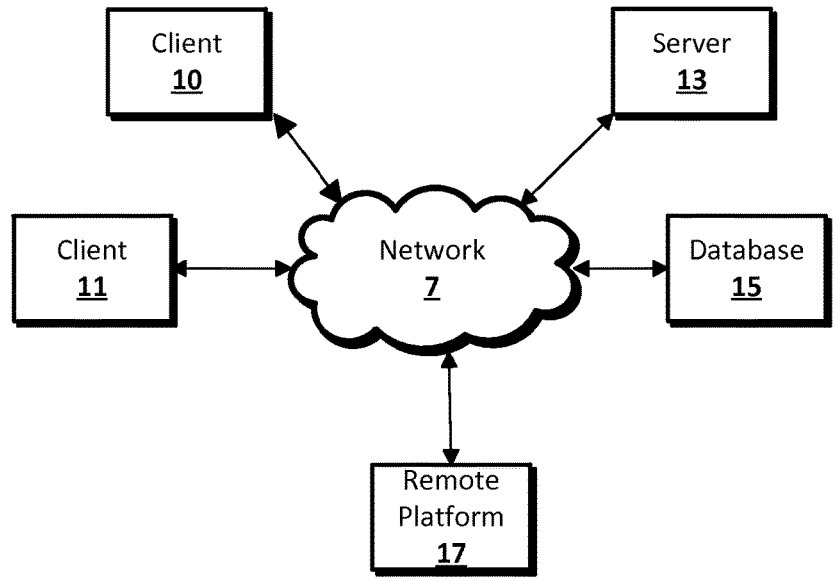
FIG. 2 shows a network configuration according to an implementation of the disclosed subject matter.

FIG. 2 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/ or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

Figure 3:
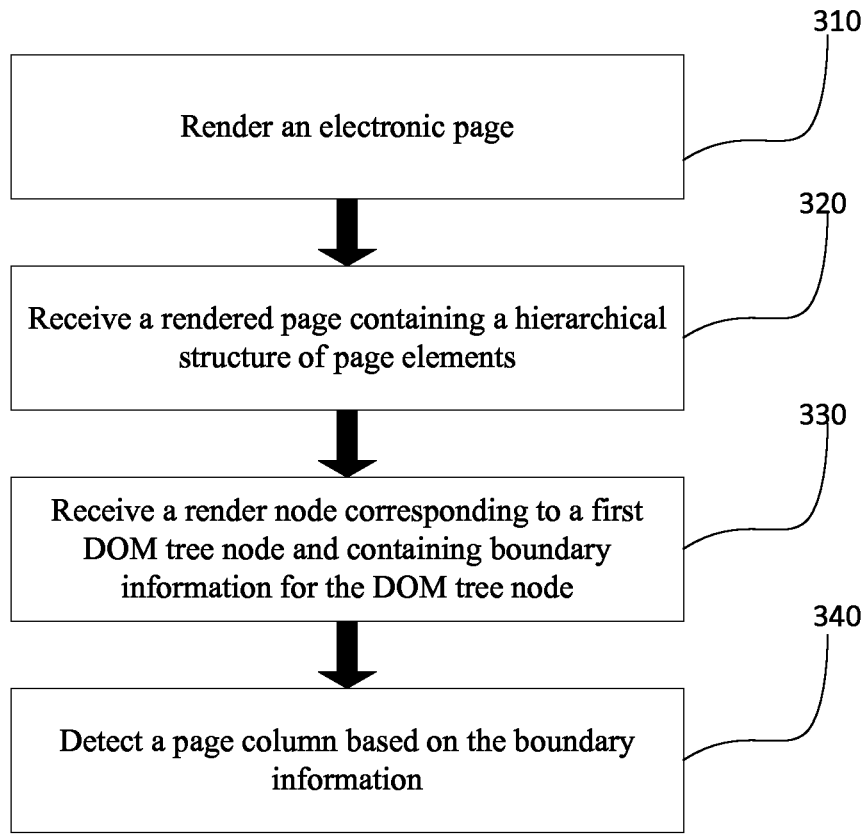
FIG. 3 shows an example process for identifying a column of interest, according to an implementation of the disclosed subject matter.

According to an implementation of the disclosed subject matter, as shown in FIG. 3 at step 310, an electronic page may be rendered by a local or remote server or by a sub-rendering module local to the arrangement. The electronic page may be any webpage, application, computer program, or the like, capable of being rendered and may conform to any applicable standard or format such as Hyper Text Markup Language (HTML), Cascading Style Sheets (CSS), Extensible Markup Language (XML), PostScript (PS), Portable Document Format (PDF), word processing document, LaTeX, or the like. More generally, the electronic page may be marked using any applicable electronic markup technique such as presentational markup, procedural markup, descriptive markup, or the like. At step 320 and 330, the arrangement may receive the rendered page which contains structured page elements, such as a render tree containing one or more render nodes. Each render node of the structured page elements may correspond to a content model node, such as a document object model (DOM) tree node. Additionally, the one or more render nodes may contain boundary information corresponding to structured elements of the content model. Boundary information may correspond to the location, intersection or collisions associated with the structured elements, and may be used to calculate the distance between an element and one or more other elements. For example, a page render may result in a table spanning one column and containing three rows and content information for the table elements may be stored in render nodes corresponding to the table. In addition to the table element information, the render nodes may also contain additional information corresponding to the location of the table. Specifically, the render nodes may contain the coordinates for where a table element collides with another table element or with other structured elements on the page.

According to an implementation of the disclosed subject matter, as shown at step 340, the arrangement may detect one or more columns within a page based on the boundary information contained in the render nodes. Detecting the one or more page columns may provide the arrangement with the layout of the electronic page, and may enable identification of a column of interest as disclosed herein. A column may be detected based on the information contained in the render nodes associated with an electronic page. A render node corresponding to a structural element contain content information as well as any applicable location information such as element collision information (e.g., where an element collides with another element, where an element collides with content, whether a portion of the element does not collide with any external entity, etc.), location coordinates (e.g., boundary coordinates for an element, a central location for an element, etc.), space information (e.g., free space between an element and any other element, space occupied by an element, etc.), or the like.

Figure 4A:
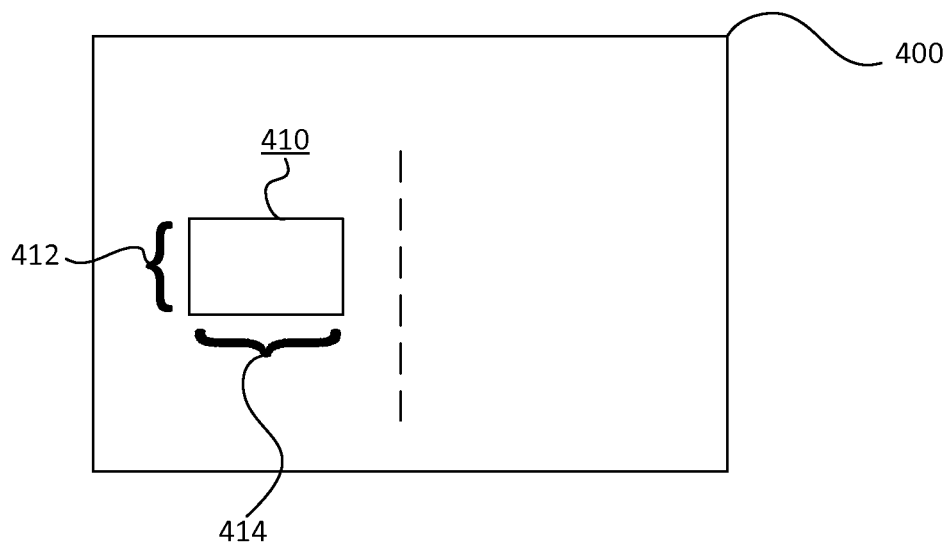
FIG. 4*a* shows an example illustration of structure dimensions according to an implementation of the disclosed subject matter.
Figure 4B:
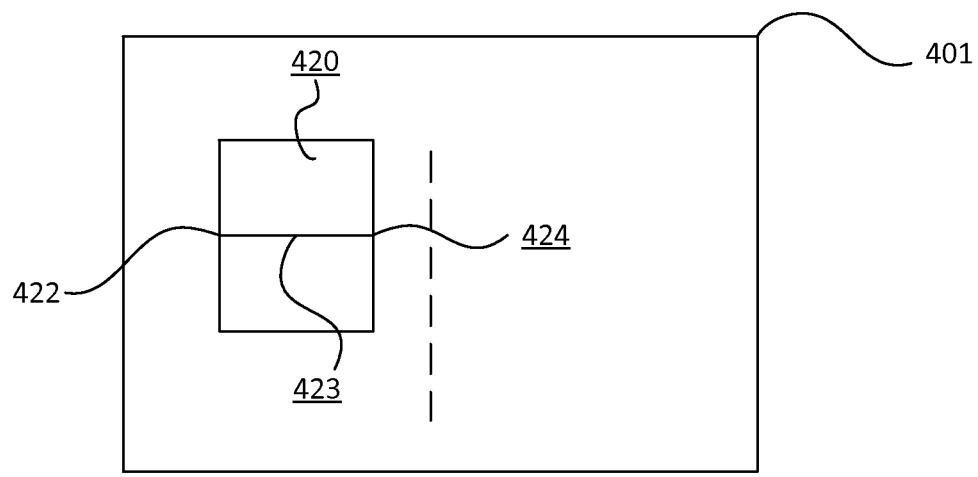
FIG. 4*b* shows an example illustration of collisions according to an implementation of the disclosed subject matter.
Figure 4C:
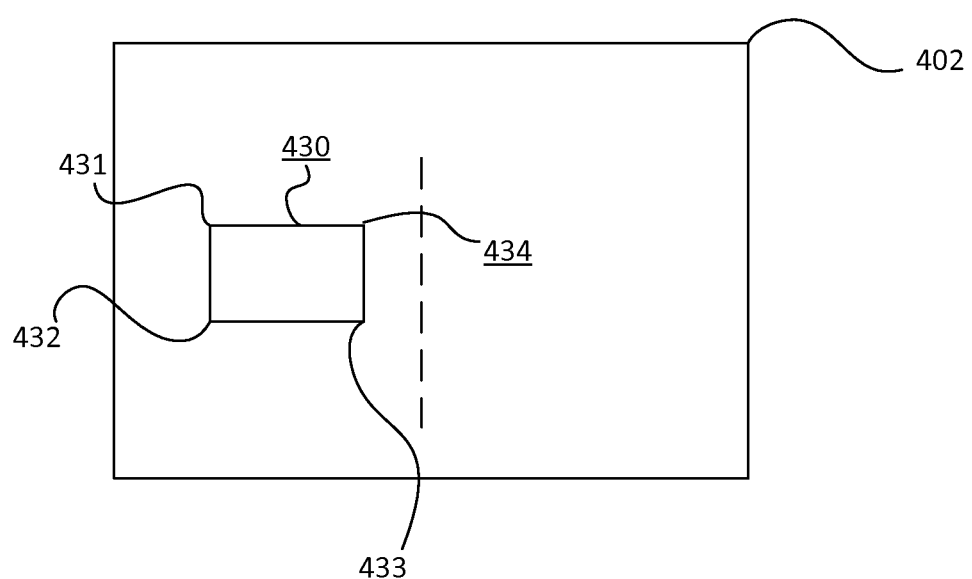
FIG. 4*c* shows an example illustration of an area occupied according an implementation of the disclosed subject matter.

In an illustrative example, as shown in FIG. 4a, an electronic page 400 may contain a structural element 410 located in a column contained within the page. The render node corresponding to the structural element 410 may contain information corresponding to the size of the structural element 410 such as element height 412 and element width 414. Alternatively or in addition, as shown in FIG. 4b, an electronic page 401 may contain structural element 420 located in a column contained within the page. The render node corresponding to the structural element 410 may contain information corresponding to collisions of the structural element 420 with structural element 421 such as the beginning of a collision 422, the points where the collision occurs 423 and the end of the collision 424. It will be understood that although the collision between two elements is described for illustrative purposes, information regarding multiple collisions with multiple elements may be provided via render nodes. Alternatively or in addition, as shown in FIG. 4c, an electronic page 402 may contain structural element 430 located in a column contained within the page. The render node corresponding to the structural element 410 may contain information corresponding to the boundary coordinates of the structural element 430 such as the top left corner 431, bottom left corner 432, bottom right corner 433, and top right corner 434. It will be understood that although a rectangular structural is described for illustrative purposes, the render node may contain boundary information for a structural element of any applicable shape and/or size.

The boundary information from one or more render nodes may allow for detection of columns in an electronic page. As disclosed herein, render nodes may correspond to document object model (DOM) tree nodes. The layout of DOM nodes may be known or established based on any applicable layout detection technique. For example, it may be known or established that a node structure of the DOM nodes is a top down structure. More specifically, the layout for the DOM nodes may be arranged such that nodes are listed in a top down vertical order and that a later listed node is generally lower in position than an earlier listed node unless the later listed node a new column starts. Thus, when the DOM is traversed during processing of the page, the beginning of a new column may be detected by a position change event, identified based on information in the corresponding render node, such as a jump-back or rewind of the structure element position. For example, a significant change in a structured element positions, as indicated by location information from corresponding render nodes, from a low position to a high position can indicate that the location of a first structured element may be closer to the bottom of a webpage and the location of a second structured element may be close to the top of the web page. More specifically, a first render node corresponding to a first structured element may indicate that the first structured element's central point is at 540 pixels vertical and a second render node corresponding to a second structured element may indicate that the second structured element's central point is at 30 pixels vertical. Accordingly, the arrangement may determine that a jump-back from a lower vertical position to a higher vertical has occurred and, thus, the second structured element is in a new column. According to an implementation, a position change event detected between a parent and/or ancestor node may not result the detection of a new column. For example, a parent element may be in a different position in comparison to a child element such that if the parent-child relationship was not established, the arrangement may designate the parent and child elements to be in different columns.

According to an implementation of the disclosed subject matter, the arrangement may identify a new column based on whether a threshold amount of change in structured element locations is detected. A change in structured element location may be a vertical or horizontal difference between a first structured element and a second element. For example, a threshold value of a 200 pixel differential between a first element lower bound and a second element upper bound may be required for the second element to be designated as part of a new column. A first structured element may contain an upper boundary at 510 pixels vertical and a lower boundary at 540 pixels vertical and a second structured element may contain an upper boundary at 30 pixels vertical and a lower boundary at 510 pixels. Accordingly, based on the difference between the lower bound of the first element at 540 pixels vertical and the upper bound of the second element at 30 pixels vertical (i.e., a 510 pixel differential), the arrangement may designate the second structured element as being part of a different column than the first structured element. Alternatively, for example, a first structured element may contain an upper boundary at 510 pixels vertical and a lower boundary at 540 pixels vertical and a second structured element may contain an upper boundary at 450 pixels vertical and a lower boundary at 510 pixels. Accordingly, based on the difference between the lower bound of the first element at 540 pixels vertical and the upper bound of the second element at 450 pixels vertical (i.e., a 90 pixel differential), the arrangement may designate the second structured element as being part of the same column as the first structured element. The threshold amount of change in structured element locations may be a predetermined value (e.g., provided by a system administrator, a user, etc.), may be established based on a factor such as one or more document dimensions (e.g., vertical, horizontal, diagonal, etc.), number of DOM nodes and/or render nodes, page content (e.g., in a structure element, on a portion of the electronic page, on the entire electronic page, etc.), may be determined based on machine learning (e.g., historical jump-back data, current page arrangement, etc.), or the like. As an example, the arrangement may machine learn a rewind distance threshold by analyzing inter-column rewind pages from the same electronic page or from another electronic page based on a similar template with ground truth column labeling. Notably, identifying one or more columns within an electronic page enables the arrangement to distinguish one or more columns from one or more other columns and, thus, identify a column of interest as disclosed herein.

Additionally, header and/or footer information may be determined based on column detection. A structural element that is the first element based on a DOM tree may correspond to an element in a header or an element on a main page and, accordingly, it can be unclear whether to designate the area occupied by the first element as being part of the header or part of the main page. According to an implementation of the disclosed subject matter, the lower bound of a header may correspond to the upper bound of the first structured element after a jump-back occurs. For example, if a jump-back event after a structured element in the leftmost column is detected in the layout of a webpage, the upper bound position of next structured element after the jump-back may indicate the lower bound of a webpage header. Specifically, if the jump-back indicates that the upper bound of the next structural element is at position X, then the header may have a lower bound at position X. Similarly, information corresponding to a footer may be determined based on column detection. The upper bound of a footer may correspond to the lower bound of the last structured element before a jump-back event occurs. For example, if a jump-back event after a structured element in the leftmost column is detected in the layout of a webpage, the structured element position directly prior to the jump-back may be the upper bound of the webpage footer. Specifically, if the jump-back to the beginning of a new column occurs directly after a structured element with a lower bound at position Y, then the footer may have an upper bound at position Y.

According to an implementation of the disclosed subject matter, as shown at step 350 in FIG. 3, a column of interest may be identified based on the detection one or more columns in an electronic page. The column of interest may be a location based column such as a central column (e.g., vertically, horizontally, or diagonally) or may be a determined based on one or more factors such as a predetermined location (e.g., provided by a system administrator, a user, a programmer, a developer, a remote server, etc.), page content (e.g., column content, page metadata, page category, page size, page element size, buttons, links, etc.), data type (e.g., text, images, files, buttons, links, etc.), page orientation, or the like. Notably, the column of interest may be identified and content from the column of interest may be utilized in a manner that is different from the content from other columns within the electronic page. As an example, a search database may use web crawlers to crawl and extract information from webpages available on the internet. The information extracted from the column of interest in a webpage can be weighed higher than information elsewhere on the page. Accordingly, the search database may classify webpages based on the more relevant information extracted from the column of interest within a webpage rather than another, less relevant, portion of a webpage. A column of interest may be marked as such according to any acceptable technique such as distinctly storing column information or content, storing column position, identifying an electronic page based only on the column of interest, assigning a marker to the beginning and/or end of the column of interest, or the like. A local or remote application (e.g., website, search engine, data extractor, third party electronic page, etc.) may identify the column of interest from within the electronic page by specifically requesting the marked column of interest or by searching for a marker associated with the column of interest. For example, a web crawler may access a webpage and specifically assess and store key data from the column of interest instead of assessing data from the entire webpage. As another example, a search entity may assign higher weights to the content within a column of interest and lower weight to content outside of the column of interest such that the results received from a search query using the search entity will be bias based on the assigned weights.

As disclosed herein, a center column may be designated as the column of interest and may be determined based on predetermined criteria or dynamically. Predetermined criteria may include identifying the column that intersects the horizontal, vertical, and/or a diagonal axis of an electronic page. Dynamic criteria may include determining a center most column from within a set of given columns based on the position of the one or more columns. For example, if a center column is not identifiable based on an axis, the arrangement may evaluate all the columns in the electronic page and identify a central column based on the evaluation. Notably, the center column may be an apparent candidate to be a column of interest as it is likely that an electronic page organizes content on the page such that the center column contains the most relevant information.

Additionally, a center column also may be identified after excluding outliers in an electronic page. An outlier may be any content that is not within an access area of the electronic page, such as a portion of the page that is not intended to be rendered as a user-viewable portion of the page, which does not fall within a document content width and height (e.g., that inferred from a standard CSS style sheets applied and rendered page), which is not typically seen by a user due to the layout of the rendered page, or which is far away from the main portion of a page. A threshold value may be used to designate outlying content. For example, 99% of the content in a webpage may be within the left most 1000 pixels of a webpage. 1% of the content may be at the $5000^{th}$ pixel value from the left. The threshold for determining an outlier can be 2% at 1000 pixels such that any content that is not within 1000 pixels of at least 2% of the webpage is an outlier. Accordingly, the 1% of the content that is 5000 pixels out, and thus 3000 pixels away from 99% of the content of the webpage, is outlying content. Outlying content may be excluded from the data set when identifying a column of interest. Continuing the example, as a result of excluding the outlying data based on the 1000 pixels of at least 2% of the webpage rule, a center column within the webpage may be identified based only on the 99% of the content within the first 2000 pixels of the webpage. Essentially, excluding outliers may allow more reliable determinations of columns of interest and, more specifically, of center columns.

Figure 6A:
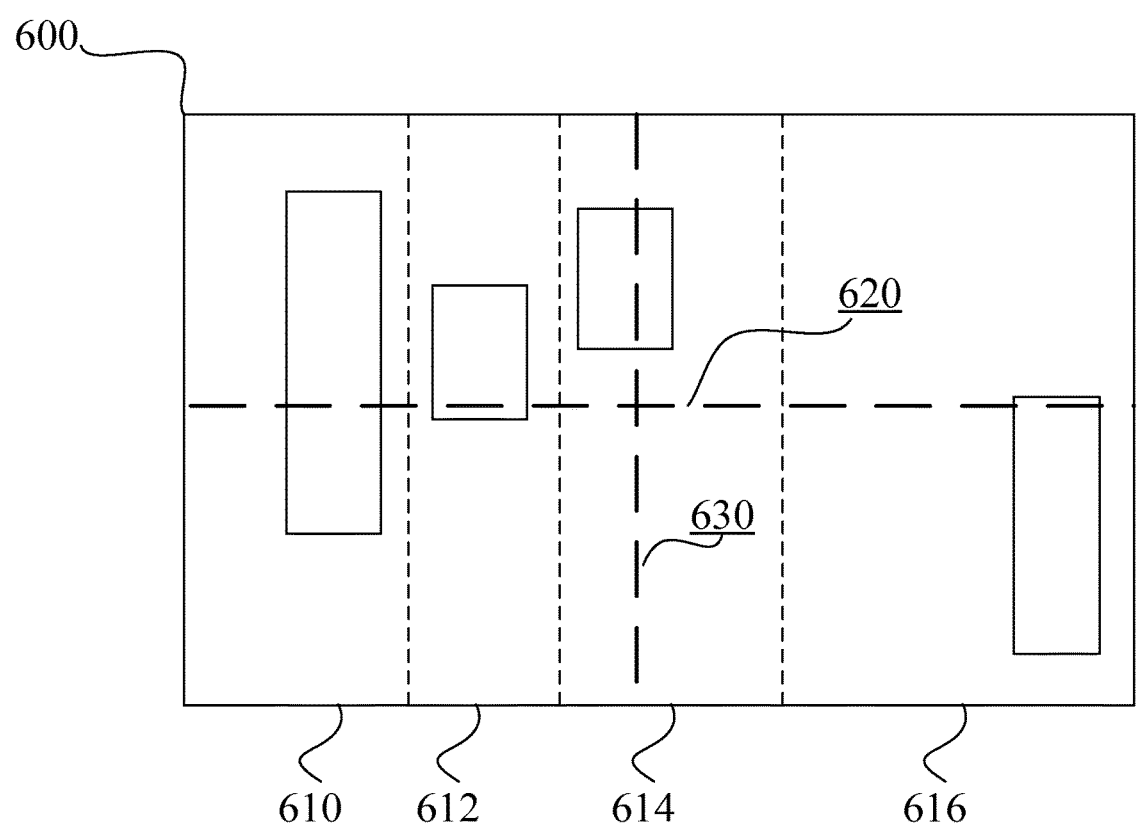
FIG. 6*a* shows an example illustration of multiple columns with an axis calculated while including an outlier according to an implementation of the disclosed subject matter.
Figure 6B:
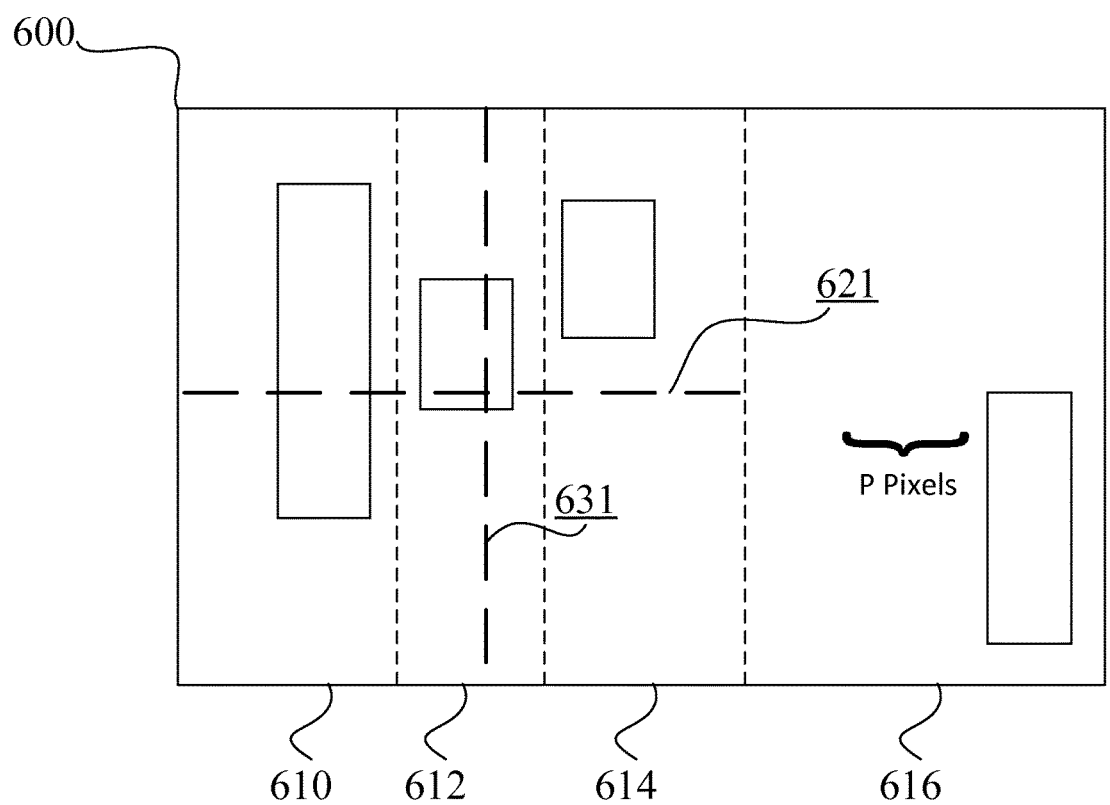
FIG. 6*b* shows an example illustration of multiple columns with an axis without including an outlier according to an implementation of the disclosed subject matter.

In an illustrative example of excluding outlying content, as shown in FIG. 6a, a webpage 600 may contain user relevant data columns 610, 612, and 614 as well as a system relevant tracking column 616, identified based on respective structural elements contained within the columns. Identifying a central column without excluding outliers may result in a horizontal axis 630 and a vertical access 620 such that column 614 may be identified as a central column despite column 614 being a right most column of the user relevant data columns 610, 612, and 614. As an example, an outlier rule may exclude any structural elements that are not within P number of pixels from another structural element. As shown in FIG. 6b, column 616 may be excluded from the center column calculation as structured elements within column 616 are not within P pixels of another structured element. Accordingly, the revised horizontal axis 621 and vertical axis 631 may identify column 612 as the central column. Notably, in the presented example, identifying column 612 as the central column is preferable as it is the central column of the user relevant data columns 610, 612, and 614 and, therefore, is most likely to contain the content sought for by the arrangement.

Figure 5:
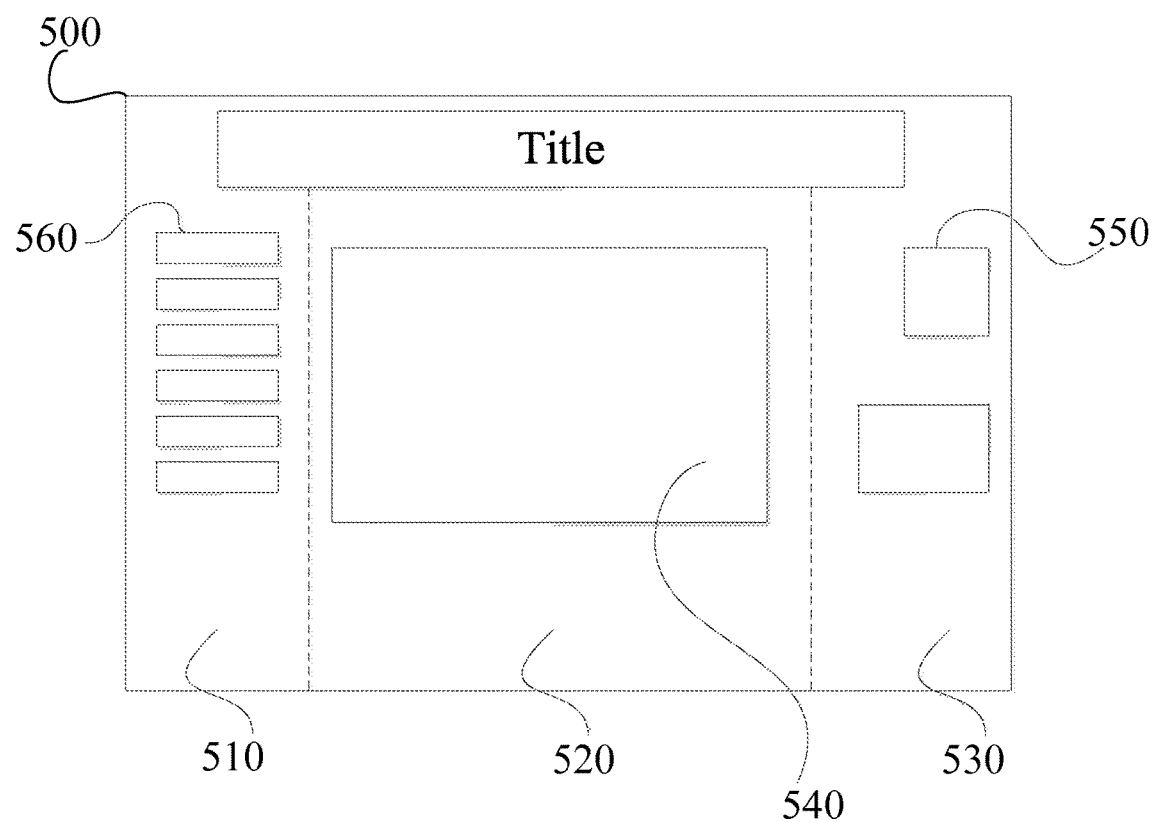
FIG. 5 shows an example illustration of a multi columned page according to an implementation of the disclosed subject matter.

As an illustrative example of the disclosed subject matter, as shown in FIG. 5, a webpage 500 may contain structured elements arranged by columns. The leftmost column 510 may contain navigation buttons 560, the center column 520 may contain a main content block 540 and the rightmost column 530 may contain advertisements 550. As disclosed herein, the render nodes containing location information and corresponding to structural elements 560, 540 and 550 may be provided to the arrangement based on a render of the webpage 500. The arrangement may identify columns 510 and 520 based on the bottom boundary of the last navigation button 560 and the subsequent upper boundary of the main content block 540. Additionally, arrangement may identify column 530 based on the bottom boundary of the main content block 540 and upper boundary of advertisement 550. Additionally, the arrangement may identify a header 570 based on the upper boundary of the main content block 540 and/or advertisement 550. Column 520 may be identified as the column of interest based on either being in the horizontally central location and/or containing the most data.

In another example of the disclosed subject matter, webpage A and webpage B may be rendered by a render server. Webpage A may contain text stating "Wrist Watch" only within its center column. Webpage B may contain the text string "Wrist Watch" only within an advertisement in its right most column. Webpage A and B may be identical in all other aspects. A left, center, and right column for both Webpage A and webpage B may be determined by determining a jump-back starting at the 600 pixel vertical mark at both a 100 pixel horizontal mark (i.e., bottom of first column) and 500 pixel horizontal mark (i.e., bottom of center column). Based on the determination of the center columns for Webpage A and B, the content within the center columns can be marked as important. Accordingly, the text "Wrist Watch" may be weighed heavier in Webpage A and lighter in Webpage B. Subsequently, a user may input a search query for "Wrist Watch" into a search engine and receive a list of webpages such that Webpage A is ranked higher than Webpage B as, given that all other aspects of Webpage A and B are identical, the text string "Wrist Watch" is weighed higher for Webpage A in comparison with Webpage B.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer implemented method, comprising:
receiving render nodes for a rendered electronic page, each render node corresponding to a respective document object model tree node, and each render node including respective boundary information corresponding to a structured element of the respective document object model tree node to which the render node corresponds, wherein the render nodes are part of a render tree;
identifying, from the respective boundary information and based on an outlier threshold value, one or more outliers of the rendered electronic page, wherein an outlier is content that is not rendered as a user-viewable portion of the rendered electronic page, and wherein the outlier threshold value designates a boundary on the rendered electronic page where information outside of the boundary contains outlying content for the rendered electronic page, the designation based on where a highest percentage of content is located within the rendered electronic page;
excluding, from the respective boundary information, boundary information that is outside of the outlier threshold value, including the one or more identified outliers;
detecting, from the respective boundary information of the render nodes, a plurality of page columns of the rendered electronic page, wherein the respective boundary information excludes the boundary information of the one or more identified outliers;
determining, from the plurality of page columns and the boundary information of the render nodes, that one of the page columns is a column of interest, the determination being based on criteria related to positions of the column in the rendered electronic page; and
utilizing, by a searching engine, during classifying the rendered electronic page, the content in the column of interest associated with the rendered electronic page in a manner that is different from the utilizing of content from other columns within the rendered electronic page, wherein utilizing of content from other columns within the rendered electronic page comprises assigning a weight for content within the column of interest that is higher than weights assigned to content outside of the column of interest.

2. The method of claim 1, wherein a hierarchy of the structured elements is a render tree.

3. The method of claim 1, wherein a document object tree model is based on a world wide web consortium standard.

4. The method of claim 1, wherein a document model tree node is part of a document model tree and is based on a markup language standard.

5. The method of claim 1, wherein boundary information includes one or more coordinates describing a location of one or more structured elements within the rendered electronic page.

6. The method of claim 5, wherein the one or more coordinates correspond to collisions of two or more structured elements.

7. The method of claim 6, wherein the one or more coordinates describe an amount of free space between two or more structured elements.

8. The method of claim 7, wherein the center column is identified based on outlying content of the rendered electronic webpage, and wherein outlying content is identified based on a predefined threshold value used to define limits of the rendered electronic page that contains the outlying content.

9. The method of claim 1, wherein the column of interest is a center column.

10. The method of claim 9, wherein the center column is identified according to predefined criteria defining a location of a known vertical axis, a known horizontal axis, and a known diagonal axis of the rendered electronic page.

11. The method of claim 9, wherein the center column is identified according to dynamic criteria that evaluates all columns within the rendered electronic page to identify the center column.

12. The method of claim 1, wherein determining page columns further comprises: measuring a pixel difference between a lower bound of a first structured element within the rendered electronic page and an upper bound of a second structured element within the rendered electronic page; and determining a new column based on the pixel difference meeting a threshold amount of change in structured element locations, wherein the threshold amount is based on a predetermined value.

13. A system, comprising:
a data processing apparatus including one or more hardware processors; and
a memory storage apparatus in data communication with the data processing apparatus, the memory storage apparatus storing instructions executable by the data processing apparatus and that upon such execution cause the data processing apparatus to perform operations comprising:
receiving render nodes for a rendered electronic page, each render node corresponding to a respective document object model tree node, and each render node including respective boundary information corresponding to a structured element of the respective document object model tree node to which the render node corresponds, wherein the render nodes are part of a render tree;
identifying, from the respective boundary information and based on an outlier threshold value, one or more outliers of the rendered electronic page, wherein an outlier is content that is not rendered as a user-viewable portion of the rendered electronic page, and wherein the outlier threshold value designates a boundary on the rendered electronic page where information outside of the boundary contains outlying content for the rendered electronic page, the designation based on where a highest percentage of content is located within the rendered electronic page;
excluding, from the respective boundary information, boundary information that is outside of the outlier threshold value, including the one or more identified outliers;
detecting, from the respective boundary information of the render nodes, a plurality of page columns of the rendered electronic page, wherein the respective boundary information excludes the boundary information of the one or more identified outliers;
determining, from the plurality of columns and the boundary information of the render nodes, that one of the page columns is a column of interest, the determination being based on criteria related to positions of the column in the rendered electronic page; and
utilizing, by a searching engine, during classifying the rendered electronic page, the content in the column of interest associated with the rendered electronic page in a manner that is different from the utilizing of content from other columns within the rendered electronic page, wherein utilizing of content from other columns within the rendered electronic page comprises assigning a weight for content within the column of interest that is higher than weights assigned to content outside of the column of interest.

14. The system of claim 13, wherein a hierarchy of the structured elements is a render tree.

15. The system of claim 13, wherein a document object tree model is based on a world wide web consortium standard.

16. The system of claim 13, wherein a document model tree node is part of a document model tree and is based on a markup language standard.

17. The system of claim 13, wherein boundary information includes one or more coordinates describing a location of one or more structured elements within the rendered electronic page.

18. The system of claim 17, wherein the one or more coordinates correspond to collisions of two or more structured elements.

19. The system of claim 18, wherein the one or more coordinates describe an amount of free space between two or more structured elements.

20. The system of claim 19, wherein the center column is identified based on outlying content of the rendered electronic webpage, and wherein outlying content is identified based on a predefined threshold value used to define limits of the rendered electronic page that contains the outlying content.

21. The system of claim 13, wherein the column of interest is a center column.

22. The system of claim 21, wherein the center column is identified according to predefined criteria defining a location of a known vertical axis, a known horizontal axis, and a known diagonal axis of the rendered electronic page.

23. The system of claim 21, wherein the center column is identified according to dynamic criteria that evaluates all columns within the rendered electronic page to identify the center column.

24. The system of claim 13, wherein determining page columns further comprises: measuring a pixel difference between a lower bound of a first structured element within the rendered electronic page and an upper bound of a second structured element within the rendered electronic page; and determining a new column based on the pixel difference meeting a threshold amount of change in structured element locations, wherein the threshold amount is based on a predetermined value.

* * * * *